(12) United States Patent
Greenblatt et al.

(10) Patent No.: US 11,370,501 B2
(45) Date of Patent: Jun. 28, 2022

(54) SPACE-SAVING BICYCLE PARKING STRUCTURE

(71) Applicant: Everlast Climbing Industries, Inc., Minneapolis, MN (US)

(72) Inventors: Joel Greenblatt, Wauwatosa, WI (US); Andrew Kennedy Lageson, Minneapolis, MN (US)

(73) Assignee: EVERLAST CLIMBING INDUSTRIES, INC., Minneapolis, MN (US)

( * ) Notice: Subject to any disclaimer, the term of this patent is extended or adjusted under 35 U.S.C. 154(b) by 0 days.

(21) Appl. No.: 17/066,811

(22) Filed: Oct. 9, 2020

(65) Prior Publication Data

US 2021/0031847 A1 Feb. 4, 2021

Related U.S. Application Data

(63) Continuation of application No. 15/876,790, filed on Jan. 22, 2018, now Pat. No. 10,807,664, which is a continuation of application No. 14/677,650, filed on Apr. 2, 2015, now Pat. No. 9,873,472.

(51) Int. Cl.
*B62H 3/02* (2006.01)
*B62H 3/12* (2006.01)

(52) U.S. Cl.
CPC ............... *B62H 3/02* (2013.01); *B62H 3/12* (2013.01)

(58) Field of Classification Search
CPC . A47B 47/0091; A47B 47/0083; A47B 91/00; F16B 1/00; F16B 2001/0035; B62H 3/02; B62H 3/04; B62H 3/12; H01F 7/0252; A47C 13/005; A47C 17/34; A47C 31/003

USPC .......................................................... 13/187
See application file for complete search history.

(56) References Cited

U.S. PATENT DOCUMENTS

| | | |
|---|---|---|
| 592,086 A | 10/1897 | Frambes |
| 642,561 A | 1/1900 | Phillips |
| 650,663 A | 5/1900 | Whitcher |
| 706,718 A | 8/1902 | Bradbury |
| D36,091 S | 9/1902 | Merritt |

(Continued)

FOREIGN PATENT DOCUMENTS

| | | | |
|---|---|---|---|
| FR | 2558430 | 1/1984 | |
| FR | 2558430 A1 * | 7/1985 | ............... B62H 3/02 |
| KR | 2011013087 | 2/2011 | |

*Primary Examiner* — Ko H Chan
(74) *Attorney, Agent, or Firm* — McAndrews, Held & Malloy, Ltd.

(57) ABSTRACT

The present disclosure is directed to a bicycle parking structure comprising a plurality of bicycle hangers supported by a crossbar assembly. Each bicycle hanger is configured to support a bicycle in a substantially vertical position. The bicycle hangers are spaced apart from one another along the length of the crossbar assembly. Each of the bicycle hangers may be secured to the crossbar assembly so that the bicycle hanger is fixed at a desired position or unsecured from the crossbar assembly so that the position of the bicycle hanger along the length of the crossbar assembly may be adjusted. In this manner, the distance between adjacent bicycles need not be fixed and the bicycle parking structure can be adapted for a particular space. The bicycle parking structure is designed to provide for a space-efficient, high-volume parking of bicycles.

23 Claims, 10 Drawing Sheets

(56) References Cited

U.S. PATENT DOCUMENTS

| | | | |
|---|---|---|---|
| 774,995 A * | 11/1904 | Speir | B62H 3/12 |
| | | | 211/17 |
| 934,148 A | 9/1909 | Duff | |
| 3,603,459 A | 9/1971 | Erb | |
| 3,918,279 A | 11/1975 | Williamson | |
| 4,015,718 A | 4/1977 | Bernard | |
| 4,171,077 A | 10/1979 | Richard, Jr. | |
| 4,352,432 A | 10/1982 | Smith | |
| 5,238,125 A * | 8/1993 | Smith | B62H 3/08 |
| | | | 211/19 |
| 5,417,629 A | 5/1995 | Phipps | |
| 5,702,007 A * | 12/1997 | Fritz | B62H 3/08 |
| | | | 211/17 |
| 5,743,411 A * | 4/1998 | Hawkes | B62H 3/04 |
| | | | 211/19 |
| 5,992,647 A | 11/1999 | Malik | |
| 5,996,870 A * | 12/1999 | Shaver | B60R 9/06 |
| | | | 224/324 |
| 6,223,907 B1 * | 5/2001 | Graber | B62H 3/00 |
| | | | 211/17 |
| 6,336,562 B1 | 1/2002 | Mori | |
| 6,419,096 B1 * | 7/2002 | Shepherd | B62H 3/12 |
| | | | 211/18 |
| 6,866,175 B2 | 3/2005 | Munoz et al. | |
| 7,055,700 B2 | 6/2006 | West | |
| 7,641,086 B2 | 1/2010 | Green | |
| D632,616 S | 2/2011 | Lohr et al. | |
| 7,946,432 B1 | 5/2011 | Swanson et al. | |
| 8,500,074 B1 | 8/2013 | Cochran et al. | |
| 8,528,749 B2 * | 9/2013 | Kerman | A47B 57/562 |
| | | | 211/22 |
| 8,733,605 B2 * | 5/2014 | Pedrini | B60R 9/10 |
| | | | 224/488 |
| 8,827,363 B2 * | 9/2014 | Lagier | B61B 12/002 |
| | | | 297/217.1 |
| 9,159,254 B2 * | 10/2015 | Oyoung | G09F 17/00 |
| 9,340,245 B2 * | 5/2016 | Kerman | A47B 57/34 |
| 2012/0027560 A1 * | 2/2012 | Olsen | B60R 9/06 |
| | | | 414/800 |
| 2012/0111911 A1 * | 5/2012 | Rempe | B60P 3/07 |
| | | | 224/403 |

* cited by examiner

SPACE-SAVING BICYCLE PARKING STRUCTURE

This application is a continuation of U.S. patent application Ser. No. 15/876,790, filed on Jan. 22, 2018, which is a continuation of U.S. patent application Ser. No. 14/677,650, filed on Apr. 2, 2015, and granted as U.S. Pat. No. 9,873,472 B2 on Jan. 23, 2018.

BACKGROUND OF THE INVENTION

Although bicycle parking structures to suit a number of needs are currently available, conventional structures that are configured for the high-density parking of bicycles suffer from a number of drawbacks. For instance, most high-density bicycle parking structures are configured to provide a fixed distance between adjacent bicycles. Yet in many situations, that fixed distance may not provide the most efficient or effective use of the space in which the structure is placed. The modular bicycle parking structure of the present disclosure provides a low-cost bicycle parking structure that may be configured for the high-density parking of bicycles and that does not suffer from these drawbacks.

SUMMARY OF THE INVENTION

Embodiments of the present disclosure are directed to a bicycle parking structure comprising a plurality of bicycle hangers being supported by a crossbar assembly. Each bicycle hanger is configured to support a bicycle in a substantially vertical position. The bicycle hangers are spaced apart from one another along the length of the crossbar assembly. Each of the bicycle hangers is configured so that one may (a) locate the bicycle hanger at a desired position along the length of the crossbar assembly and (b) secure the bicycle hanger to the crossbar assembly at the desired position, such that the bicycle hanger does not inadvertently move along the length of the crossbar assembly during use. The structure is also configured so that one may unsecure each of the bicycle hangers from the crossbar assembly, such that the position of the bicycle hangers along the length of the crossbar assembly may be adjusted. In this manner, the distance between adjacent bicycles need not be fixed and the bicycle parking structure can be adapted for a particular space or a desired use.

In some embodiments, the plurality of bicycle hangers may be configured to have staggered heights along the length of the crossbar assembly. For instance, each bicycle hanger may be configured to be mounted to the crossbar assembly at one of two or more different heights. By staggering the heights of the bicycle hangers, one may provide for a higher number of bicycles to be parked in a given space by reducing the interference between adjacent bicycle handlebars, pedals, and the like.

In various embodiments, the parking structure may either be a standing structure or a structure that is mounted to a wall. For instance, in some embodiments, the bicycle parking structure may include a first leg configured for supporting a first end of the crossbar assembly and a second leg configured for supporting a second end of the crossbar assembly. The first and second legs are configured to support the crossbar assembly at a desired height and to provide a stable ground support for the structure. In other embodiments, the bicycle parking structure may include a first wall bracket configured for mounting a first end of the crossbar assembly to a wall and a second wall bracket configured for mounting a second end of the crossbar assembly to the wall. The first and second wall brackets are configured to be secured to the wall and to support the crossbar assembly at a desired height. In some embodiments, the legs or the wall mounts may be configured for supporting one end of a first crossbar assembly and one end of an additional second crossbar assembly. In this way, multiple crossbar assemblies may be connected together to provide a modular parking structure having a desired size and/or parking capacity.

In various embodiments, each of the plurality of bicycle hangers comprises a mounting component and a bicycle-hanging component. The mounting component is configured to mount the bicycle hanger to the crossbar assembly and the bicycle-hanging component is configured to support a bicycle in a substantially vertical position. In some embodiments, the mounting component may include a number of slots arranged along a substantially vertical axis, with each slot being configured to receive one of the one or more crossbars that make up the crossbar assembly. In order to provide for the mounting of the bicycle hangers at different heights, the number of slots may be greater than the number of crossbars. The mounting component of the bicycle hanger may be secured to the crossbar assembly through the use of any suitable fastener. In some embodiments, for example, the mounting component may be secured to the crossbar assembly through a tamper-resistant fastener. In order to adjust the position of the bicycle hanger along the length of the crossbar assembly, the fastener may be removed or loosened and then replaced or tightened once the desired position has been obtained.

In some embodiments, the bicycle-hanging component of the bicycle hanger may include a body configured to provide a surface to which a bicycle can be locked, such as with a conventional U-shaped lock or cable lock, and an arm configured to support a front wheel of a bicycle. At least the body of the bicycle hanger may be made of squared steel tubing. The use of squared steel tubing provides the structure with enhanced bicycle security by impeding the potential theft of a bicycle using pipe cutters to cut through the body of the bicycle hanger and enable the removal of the lock. In some embodiments, the bicycle-hanging component of the bicycle hanger may be angled so as to provide the structure with a smaller footprint and, accordingly, an increased bicycle parking efficiency. For example, in some embodiments the bicycle-hanging component of the bicycle hanger may form an angle with the one or more crossbars that is between about 45° and about 75°.

Embodiments of the present disclosure are directed to a bicycle parking structure comprising a plurality of bicycle hangers, each bicycle hanger being configured to support a bicycle in a substantially vertical position, and a crossbar assembly comprising a first crossbar and a second crossbar, the first and second crossbars being vertically spaced from one another. The crossbar assembly is configured to support the plurality of bicycle hangers in a spaced apart relationship along the length of the first and second crossbars. Each of the bicycle hangers is configured so that a user may secure the bicycle hanger to the crossbar assembly or unsecure the bicycle hanger from the crossbar assembly. When the bicycle hanger is unsecured, the position of the bicycle hanger along the length of the crossbar assembly may be adjusted. In this manner, the distance between adjacent bicycles need not be fixed and the bicycle parking structure can be adapted for a particular space or a desired use.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

A clear conception of the advantages and features of one or more embodiments will become more readily apparent by reference to the exemplary, and therefore non-limiting, embodiments illustrated in the drawings.

DETAILED DESCRIPTION OF THE INVENTION

Reference will now be made in detail to certain embodiment(s), examples of which are illustrated in the accompanying drawings. Whenever possible, the same reference numerals will be used throughout the drawings to refer to the same or like parts.

An embodiment of a bicycle parking structure 10 is shown in FIGS. 1-7. The bicycle parking structure 10 comprises a crossbar assembly 20. The crossbar assembly 20 is made up of one or more crossbars. In the embodiment illustrated in FIGS. 1-7, for example, the crossbar assembly 20 comprises a first crossbar 21 and a second crossbar 22. While the embodiment illustrated in the Figures comprises two crossbars, it is contemplated that any number of crossbars may be used, so long as the crossbar assembly 20 is capable of supporting the desired number of bicycle hangers. The crossbar assembly 20 is configured so that the longitudinal axis of the one or more crossbars is arranged substantially parallel with the floor, i.e. horizontally. The one or more crossbars may have any desired length, which may for example be based on the intended number of bicycle hangers to be supported, the intended location of the bicycle parking structure 10, and the like.

The crossbar assembly 20 is configured to support a plurality of bicycle hangers 30. The number of bicycle hangers 30 may be selected depending on the intended use and location of the bicycle parking structure 10. In the embodiment illustrated in FIGS. 1-4, for example, the bicycle parking structure 10 comprises four bicycle hangers 30. Each bicycle hanger 30 is configured for the secured parking of a bicycle in a substantially vertical position. By providing for the substantially vertical parking of a bicycle, the bicycle parking structure 10 of the present disclosure provides for the parking of a large number of bicycles within a small floor space, or footprint. The bicycle hangers 30 are spaced apart from one another along the length of the crossbar assembly 20. And the position of each bicycle hanger 30 along the length of the crossbar assembly 20 is adjustable. Accordingly, the distance between adjacent bicycle hangers 30 may be selected in order to suit a desired use and location.

The distance between adjacent bicycle hangers 30 may generally range between about ten inches to about twenty-six inches, alternatively between about twelve inches to about twenty-four inches, alternatively between about fourteen inches to about twenty-two inches, and alternatively between about fourteen inches to about twenty inches. The larger the distance between adjacent bicycle hangers 30, the easier it is for a user to park his or her bicycle without interference from an adjacent bicycle. The desired distance between adjacent bicycle hangers 30 may therefore typically depend on the location and intended use of the structure 10. For example, a structure 10 located in a relatively larger space and/or meant to provide a relatively small amount of parking, such as a bicycle room in a housing unit, may provide a greater distance between adjacent bicycle hangers 30 than a structure 10 located in a relatively smaller space and/or intended for more high-volume parking, such as at a public transit stop. On the other hand, where user comfort is not a priority, such as may be the case for a structure 10 that is located, for example, in a storage room, the distance between adjacent bicycle hangers 30 may be smaller.

Once the desired position of a bicycle hanger 30 has been determined and reached, the bicycle hanger may be secured to the crossbar assembly 20. The bicycle hanger 30 may be secured to the crossbar assembly 20 by any suitable number and type of fastener. For example, the fasteners may be selected from a variety of bolts, screws, rivets, clips, or the like. It has been found that set screws for example may be particularly suitable as the fastener. For example, in some embodiments, each fastener may be a threaded fastener, such as a set screw, having substantially identical dimensions. In some embodiments, it also may be desirable that at least one of the fasteners used to secure the bicycle hanger 30 to the crossbar assembly 20 is a tamper-resistant fastener. A tamper-resistant fastener is any fastener that requires a specialized tool in order to remove the fastener. The use of a tamper-resistant fastener will provide the bicycle parking structure 10 with an enhanced degree of security.

In some embodiments, if at any time during the use of the structure 10 it is determined that the spacing between adjacent bicycle hangers 30 should be altered, such as in order to provide either a more space-efficient or more user-friendly structure, the position of each of the plurality of bicycle hangers on the crossbar assembly 20 may be adjusted. For example, the one or more fasteners that secure the bicycle hanger 30 to the crossbar assembly 20 may be loosened and/or removed, thereby unsecuring the bicycle hanger from the crossbar assembly. When unsecured, the bicycle hanger 30 may be moved to a new position on the crossbar assembly 20. For example, the bicycle hanger 30 may be slidable along the length of the one or more crossbars 20. Once the bicycle hanger 30 is in the new position, the bicycle hanger 30 may then be re-secured to the crossbar assembly 20, such as by tightening or replacing the one or more fasteners.

It is desirable that, when in an unsecured state, the bicycle hanger 30 is not removable from the structure 10 (at least not without additional disassembly of the structure) but rather only movable to a desired position along the length of the crossbar assembly 20. For example, when unsecured, the bicycle hanger 30 may be slidable along the length of the one or more crossbars 20, but it remains mounted on the crossbar assembly at all times during the positioning. This provides that one may assemble the parking structure 10 and then easily adjust the position of the bicycle hangers 30, such as after the structure is installed at its location of use. It also ensures that a theft may not occur by simply removing the fasteners that attach the bicycle hanger 30 to the crossbar assembly 20 and thereby removing the bicycle hanger.

In some embodiments, the structure 10 may be configured so that the heights of the bicycle hangers 30 are staggered along the length of the crossbar assembly 20. For example, where two different heights are used, such as in the embodiment shown in FIGS. 1 to 7, the bicycle hangers 30 may have alternating heights. By staggering the heights of the bicycle hangers 30, one may provide for more bicycles to be parked in a given space by reducing the interference between adjacent bicycle handlebars, pedals, and the like. The reduction of interference from adjacent bicycles also makes it easier for a user to place his or her bicycle on the bicycle hanger 30 and to remove his or her bicycle from the bicycler hanger.

The staggering of the bicycle hangers 30 may be achieved in a number of ways. In some embodiments for instance, each bicycle hanger 30 may be configured to be mounted to the crossbar assembly 20 at a selected one of two or more different heights. For instance, a bicycle hanger 30 may comprise a mounting component 31 having a number of slots 33 arranged along a substantially vertical axis, each slot being configured to receive one of the crossbars, and the number of slots being greater than the number of crossbars. The embodiment shown in the Figures, for example, comprises three slots 33: an upper slot, a middle slot, and a lower slot. Accordingly, one may mount a low bicycle hanger 30 on the first and second crossbars 21, 22 using each of the upper and middle slots respectively, and one may mount a high bicycle hanger 30 on the first and second crossbars 21, 22 using each of the middle and lower slots respectively. This manner of staggering the heights of the bicycle hangers 30 is best illustrated, for example, in FIGS. 2 and 4. One benefit from this manner of staggering is that the bicycle hangers 30 may each be manufactured to a single consistent specification, reducing manufacturing costs. Alternative manners of staggering the bicycle hangers 30 are also contemplated without departing from the scope of the present disclosure.

In some embodiments, each bicycle hanger 30 comprises a mounting component 31 and a bicycle-hanging component 32. The mounting component 31 is configured to mount the bicycle hanger 30 to the crossbar assembly 20. The mounting component 31 of the bicycle hanger may be secured to and unsecured from the crossbar assembly 20 through the use of any suitable fastener, as described above. The mounting component 31 may comprise one or more slots 33, as described above, through which the crossbar assembly 20 may be received. In some embodiments, the mounting component 31 may also comprise a tape measure slot, which is configured to allow one to attach the end of a tape measure in order to easily and accurately determine the spacing between adjacent bicycle hangers 30.

The bicycle-hanging component 32 is configured to support a bicycle in a substantially vertical position. In some embodiments, such as those shown in the Figures, the bicycle-hanging component 32 of the bicycle hanger 30 may include a body 34 configured to provide a surface to which a bicycle can be locked, such as with a conventional U-shaped lock or cable lock, and an arm 35 configured to support a front wheel of a bicycle.

In some embodiments the body 34 may have a substantially C-shaped configuration in which an upper region extends out and optionally upward from the mounting component 31, a front region extends downward and outward from the upper region to the lower region, and a lower region extends from the front region back to the mounting component. By having the lower region extend farther away from the mounting component 31 than the upper region, the body 34 provides a locking surface that aligns with the frame of the bicycle while also ensuring easy access to the arm 35 for placement of the bicycle on the bicycle hanger 30. The arm 35 may project from one side of the body 34 at an upper region of the body. Although in the embodiment shown in the Figures the arm 35 is shown as being substantially straight, the arm may also have a hooked end. The inclusion of a hooked end may provide additional stability to a bicycle that is placed on the bicycle hanger 30.

The components of the bicycle hanger 30 may each be integral with one another or various components may be joined together by conventional means. In some embodiments, at least the body 32 of the bicycle hanger may be made of squared steel tubing. The use of squared steel tubing provides the structure 10 with enhanced bicycle security by impeding the potential theft of a bicycle using pipe cutters to cut through the body of the bicycle hanger, which would enable the removal of a bicycle lock.

Figure 1:
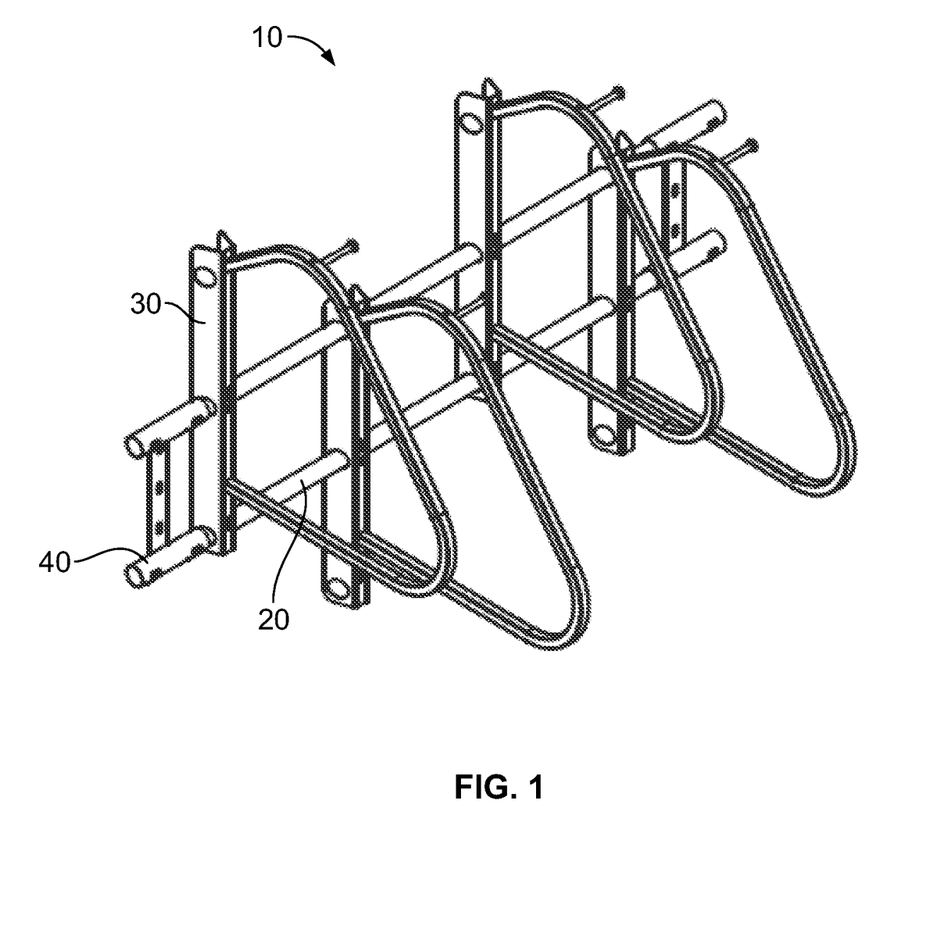
FIG. 1 is a perspective view of a wall-mounted bicycle parking structure according to an embodiment of the present disclosure.
Figure 2:
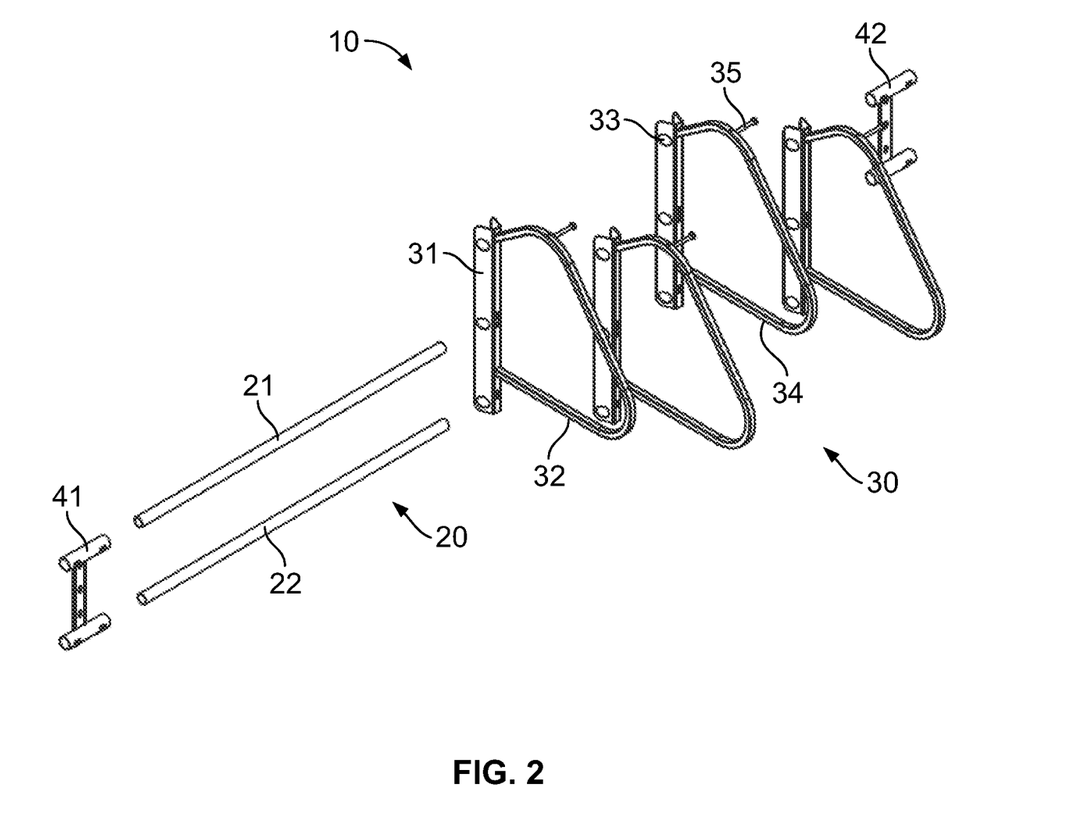
FIG. 2 is an exploded perspective view of a wall-mounted bicycle parking structure according to an embodiment of the present disclosure.

In various embodiments, the bicycle parking structure 10 may be one of a wall-mounted unit, as shown in FIGS. 1 and 2, or a standing unit, as shown in FIGS. 3 to 7.

Where the structure 10 is a wall-mounted unit, the structure may also comprise wall brackets 40. In some embodiments, such as that shown in FIGS. 1 and 2, the structure 10 may include each of a first wall bracket 41 and a second wall bracket 42. The first wall bracket 41 is configured for mounting a first end of the crossbar assembly 20 to a wall. The second wall bracket 42 is configured for mounting a second end of the crossbar assembly 20 to the same wall. Each wall bracket 30 is configured to be secured to the wall, such as through one or more wall anchors, and to support an end of a crossbar assembly 20 at a desired height.

Where the structure 10 is a standing unit, the structure may also comprise legs 50. In some embodiments, such as that shown in FIGS. 3 to 6, the structure 10 may include each of a first leg 51 and a second leg 52. The first leg 51 is configured for supporting a first end of the crossbar assembly 20 at a desired height. The second leg 52 is configured for supporting a second end of the crossbar assembly 20 at the desired height. Each leg may comprise an upright beam 53 and a foot 54. The length of the upright beam 53 is determined by the desired height of the crossbeam assembly 20. In some embodiments, for example, the length of the upright beam 53 may be between about eighty inches and about ninety inches. Each foot 54 is configured to provide a stable ground support for the structure.

The length of each foot 54 may vary depending on whether the structure 10 is to be used as a single-sided structure or a double-sided structure, as will subsequently be explained in more detail. In some single-sided embodiments, for example, the length of each foot 54 may be between about twenty-five inches and about thirty-five inches. In some double-sided embodiments, the length of each foot 54 may be between about fifty and about sixty inches. The positioning of upright beam 53 on the foot 54 may also vary depending on whether the structure is to be used as a single-sided structure or a double-sided structure. In single-sided embodiments, for example, the upright beam 53 may be positioned at an end of the foot 54. This provides that the back of the structure 10 is substantially planar, such that the back of the structure may be placed against a wall, railing, or other obstruction. In double-sided embodiments, the upright beam 53 may be positioned at the center of the foot 54. This provides that the structure 10 may provide a stable support for bicycle parking on two opposing sides of the crossbar assembly 20. Each foot 54 may be anchored to the floor, such as using conventional wedge anchors or the like.

Although not illustrated, some embodiments of the standing parking structure 10 may also comprise one or more tire-stops 55. A tire-stop 55 may comprise a material that spans between the legs 50 of a standing unit. The tire-stop 55, as the name would imply, is positioned at a height on the structure that aligns with the rear tire of a standard-sized bicycle when the bicycle is placed on a bicycle hanger 30. The tire-stop 55 may be made of any material, including for example metals, plastics, rubber, etc. In some embodiments, the tire-stop may be substantially flat. The tire-stop 55 is configured to prevent the rear bicycle tire from damaging anything that may be located to the rear of the structure (for a single-sided unit) or from interfering with another bicycle (for a double-sided unit).

Figure 3:
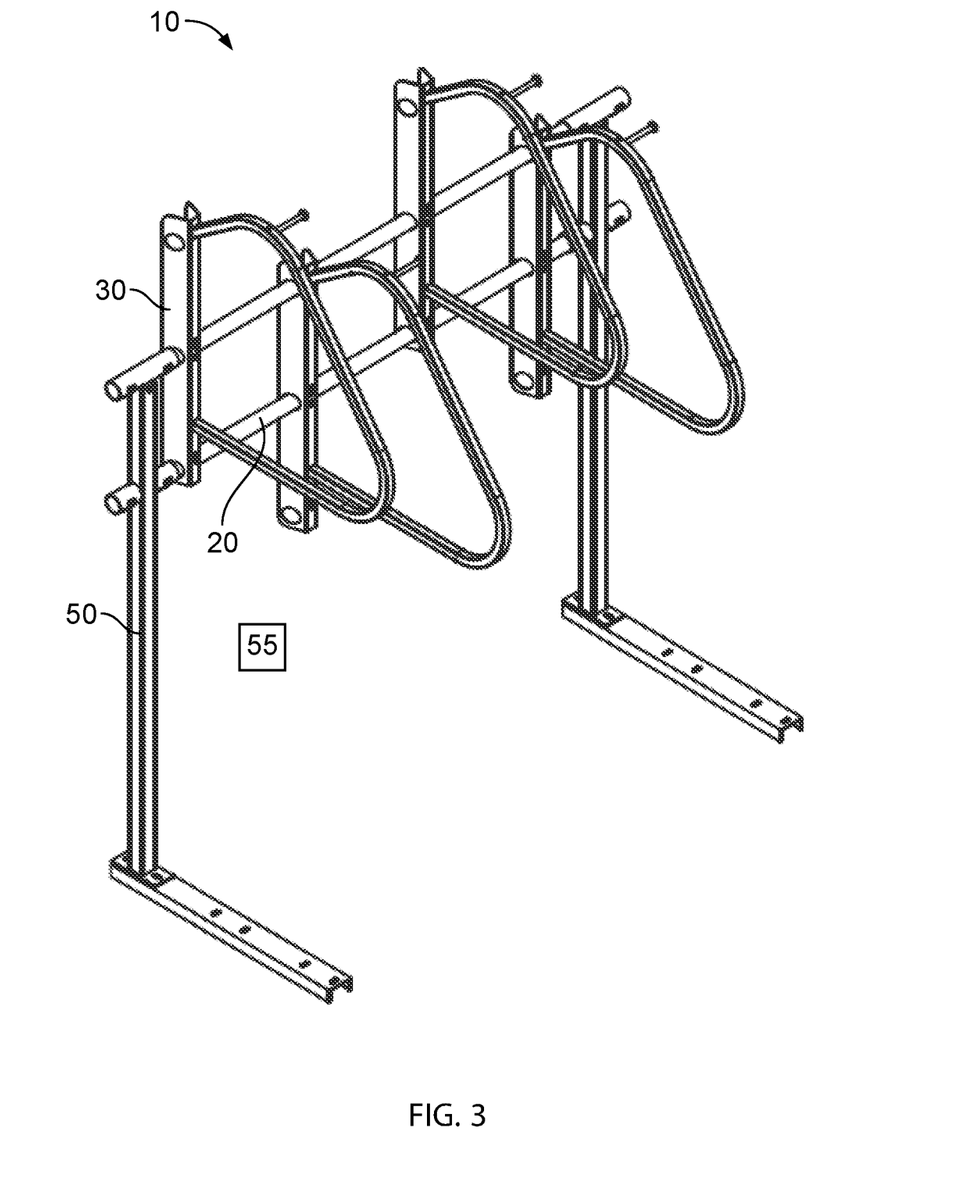
FIG. 3 is a perspective view of a standing bicycle parking structure according to an embodiment of the present disclosure.
Figure 4:
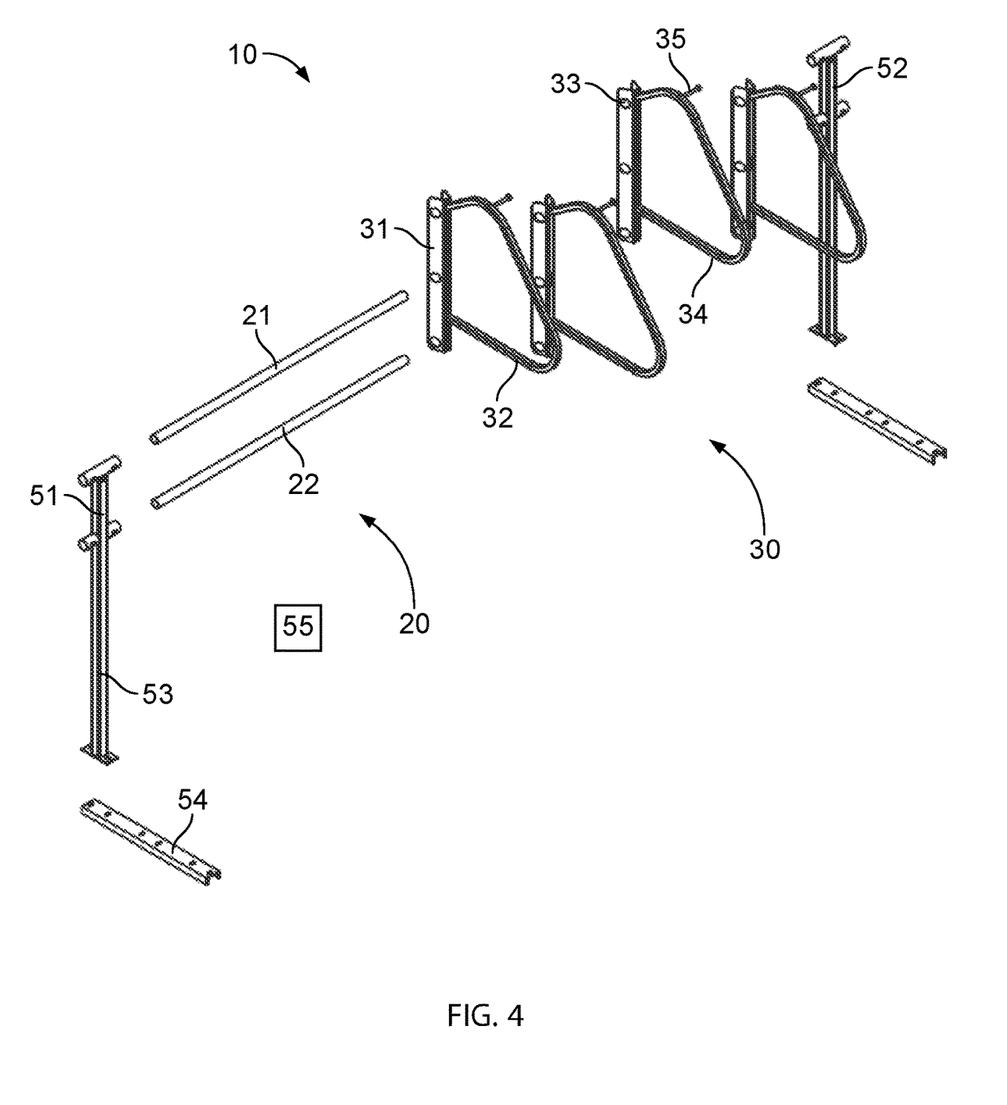
FIG. 4 is an exploded perspective view of a standing bicycle parking structure according to an embodiment of the present disclosure.

In some embodiments, the standing unit may be a single-sided unit, such as that shown in FIGS. 3 and 4. In other embodiments, the standing unit may be a double-sided unit, such as that shown in FIGS. 5 and 6.

Figure 5:
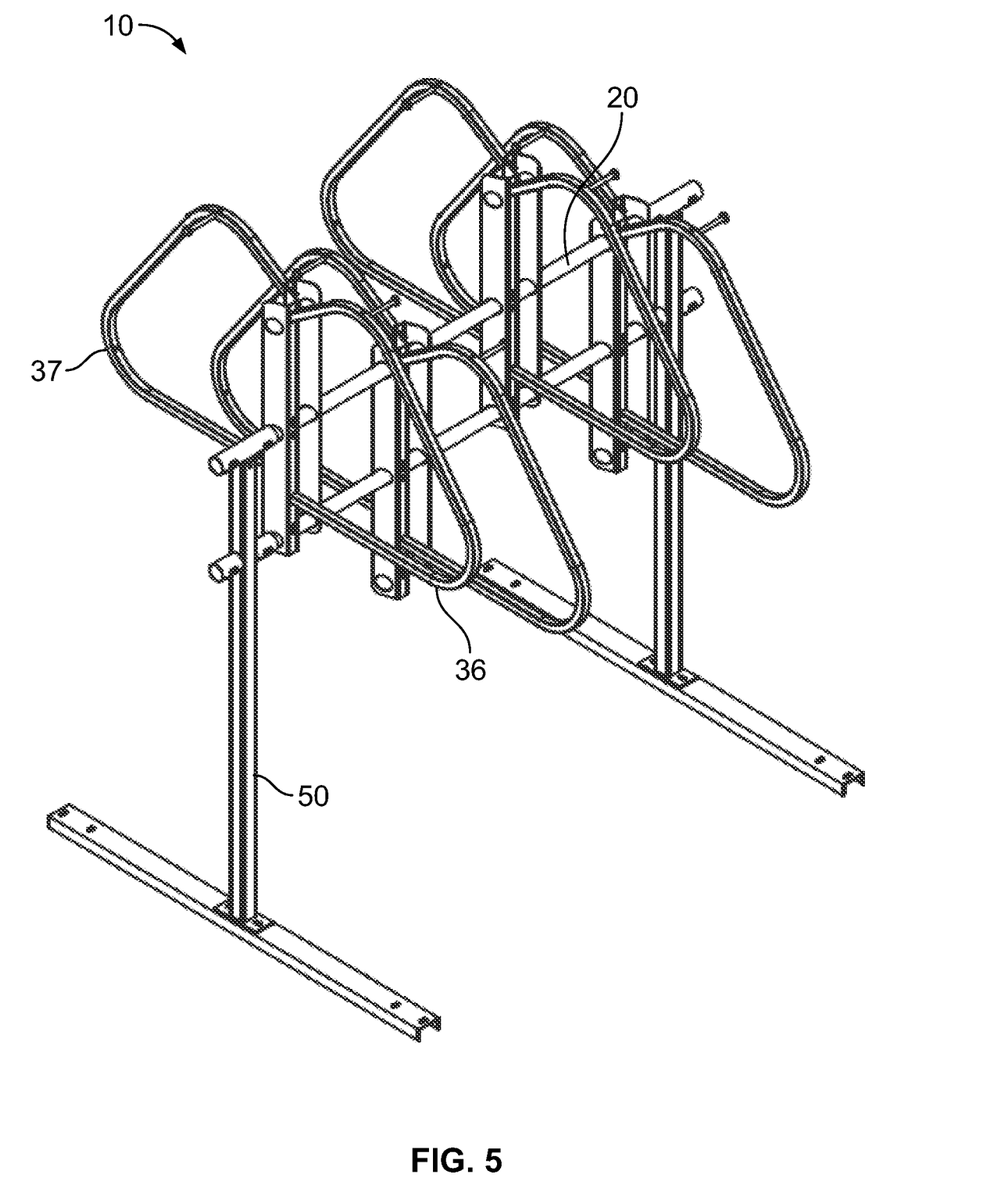
FIG. 5 is a perspective view of a double-sided standing bicycle parking structure according to an embodiment of the present disclosure.
Figure 6:
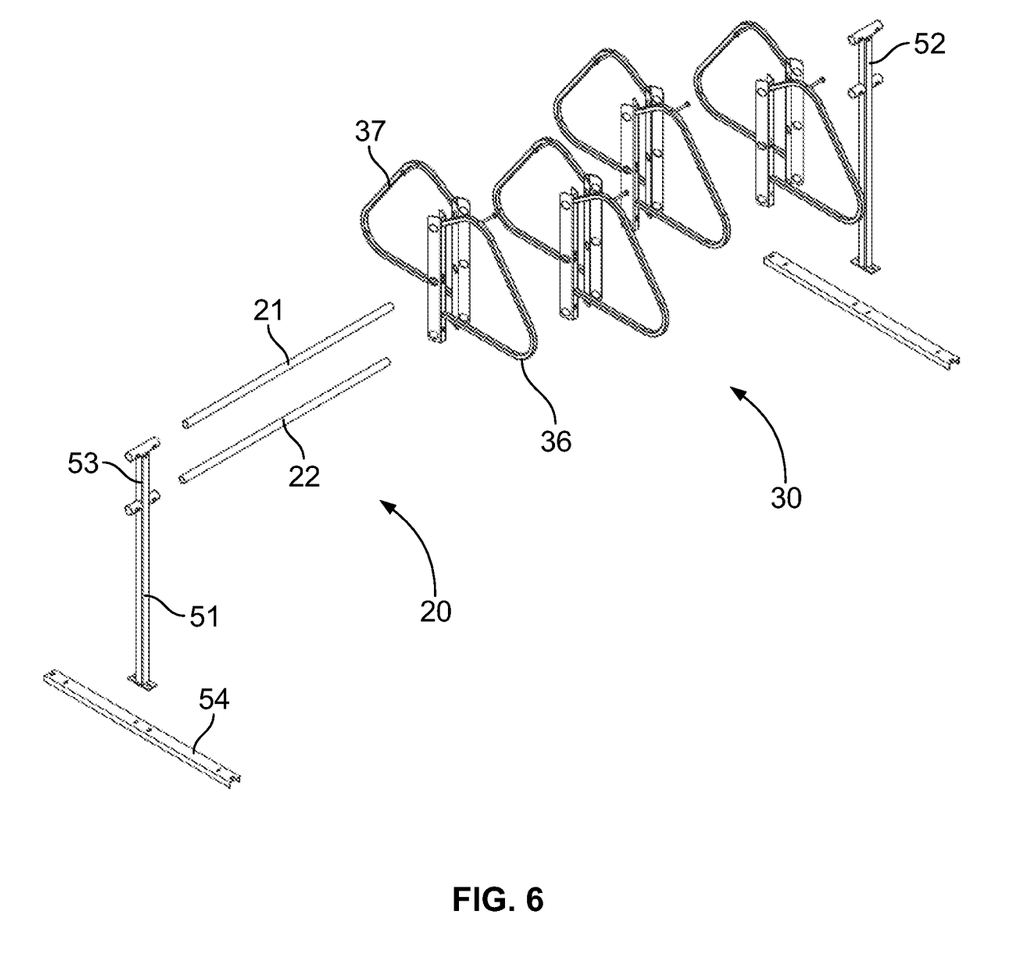
FIG. 6 is an exploded perspective view of a double-sided standing bicycle parking structure according to an embodiment of the present disclosure.

As illustrated in the Figures, a double-sided unit is configured for the parking of bicycles on two opposing sides of the crossbar assembly 20. Accordingly, the plurality of bicycle hangers 30 are mounted on the crossbar assembly 20 such that a first set of bicycle hangers 36 faces a first direction and a second set of bicycle hangers 37 faces a second direction. In order to provide the most efficient use of crossbar space, as well as to provide a clean visual appearance, the first and second sets of bicycle hangers 36, 37 may be alternated along the length of the crossbar assembly 20. For example, as shown in FIGS. 5 and 6, each one of the first set of bicycle hangers 36 may be immediately adjacent to one of the second set of bicycle hangers 37. For aesthetic reasons and ease of assembly, it may be desirable that the adjacent first and second bicycle hangers 36, 37 are positioned to have the same height.

In some embodiments, the mounting components 31 of the immediately adjacent first and second bicycle hangers 36, 37 may be configured to couple with one another. For example, as shown in the Figures, the mounting component 31 of each bicycle hanger 30 may have angled sides so that when two bicycle hangers facing in opposite directions are brought together, the opposing angled sides of the mounting components correspond and thereby provide a smooth transition from a first bicycle hanger 36 to the opposite-facing, adjacent second bicycle hanger 37.

In some embodiments, such as that shown in the Figures, the same bicycle hangers 30 may be used in connection with any of the above-described embodiments, e.g. a wall-hanging unit, a single-sided standing unit, and a double-sided standing unit. This provides for reduced manufacturing costs. However, it is also contemplated that the bicycle hangers 30 may take on different forms depending on the type of unit to be installed. For example, it is contemplated that rather than alternating first and second bicycle hangers 36, 37 to assemble a double-sided unit, each bicycle hanger 30 could instead comprise bicycle-hanging components 32 extending in two opposing directions.

Figure 7:
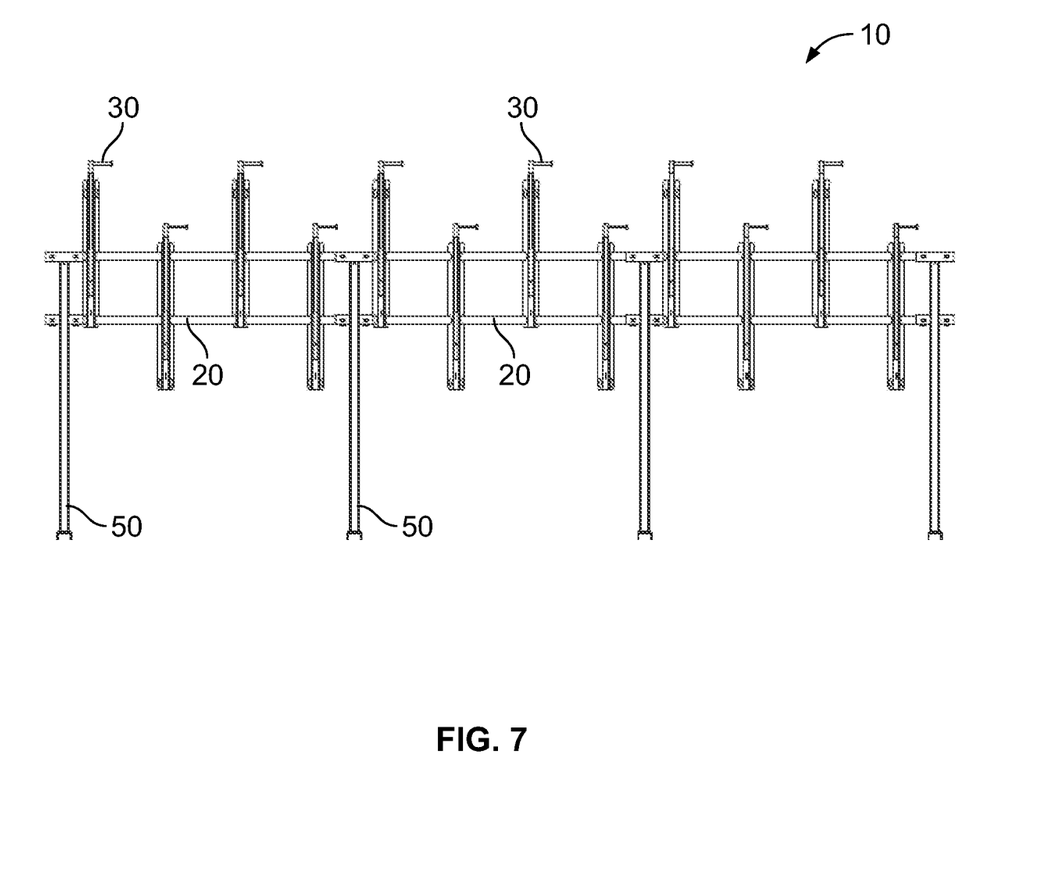
FIG. 7 is a front elevation view of a modular standing bicycle parking structure according to an embodiment of the present disclosure.

In some embodiments, the bicycle parking structure 10 may be configured so that multiple units may be connected together in series to provide a modular parking structure having any desired size and bicycle parking capacity. An example of a modular parking structure 10 of this sort is shown in FIG. 7. Although the embodiment that is shown is a single-sided standing unit, any of the other above-described embodiments, including a double-sided standing unit and a wall-mounted unit, may be configured to be connected in series to provide a modular parking structure.

For example, a standing unit may be configured such that one or more of the legs 50 is capable of supporting each of a first and second crossbar assembly 20. More specifically, a leg 50 may be configured to support both (a) an end of a first crossbar assembly 20 and (b) an end of an additional second crossbar assembly. In some embodiments, each leg 50 may be configured to have this capability, again serving to reduce manufacturing costs by providing that each leg may be manufactured to a single consistent design. Alternatively, only certain legs 50, such as those that are intended for use in the middle of the modular structure 10 as opposed to at either end of the structure, may be configured to have this capability.

Similarly, a wall-mounted unit may be configured such that one or more of the wall brackets 40 is capable of supporting each of a first and second crossbar assembly 20. More specifically, a wall bracket 40 may be configured to support both (a) an end of a first crossbar assembly 20 and (b) an end of an additional second crossbar assembly. In some embodiments, each wall bracket 40 may be configured to have this capability, again serving to reduce manufacturing costs by providing that each wall bracket may be manufactured to a single consistent design. Alternatively, only certain wall brackets 40, such as those that are intended for use in the middle of the modular structure 10 as opposed to at either end of the structure, may be configured to have this capability.

In some wall-mounted and single-sided standing embodiments, the parking structure 10 of the present disclosure may be configured so that, with bicycles placed on the plurality of bicycle hangers 30, the depth of the structure between the rear of the structure and the furthest frontwardly extending portion of the bicycle (typically the seat) is about forty inches or less. In a double-sided standing embodiment, the parking structure 10 of the present disclosure may be configured so that, with bicycles placed on the plurality of first and second sets of bicycle hangers 36, 37, the depth of the structure between the furthest extending portion of the bicycles on one side and the furthest extending portion of the bicycles on the other side is about eighty inches or less. Additionally, where two parking structures 10 are to face one another, it is desirable to maintain at least about a thirty-six inch aisle between the two structures (as measured from the furthest extending portion of the bicycles that are placed on the structure). And, as previously described, the spacing between the bicycle hangers 30 may vary depending on the desired use. In some embodiments, for instance, the spacing between bicycle hangers 30 is between about fourteen inches and about eighteen inches. Accordingly, embodiments of the bicycle parking structure 10, such as those having the above-described dimensions, provide for an extremely efficient use of floor space, which is particularly beneficial in locations configured for the high volume parking of bicycles.

Figure 8:
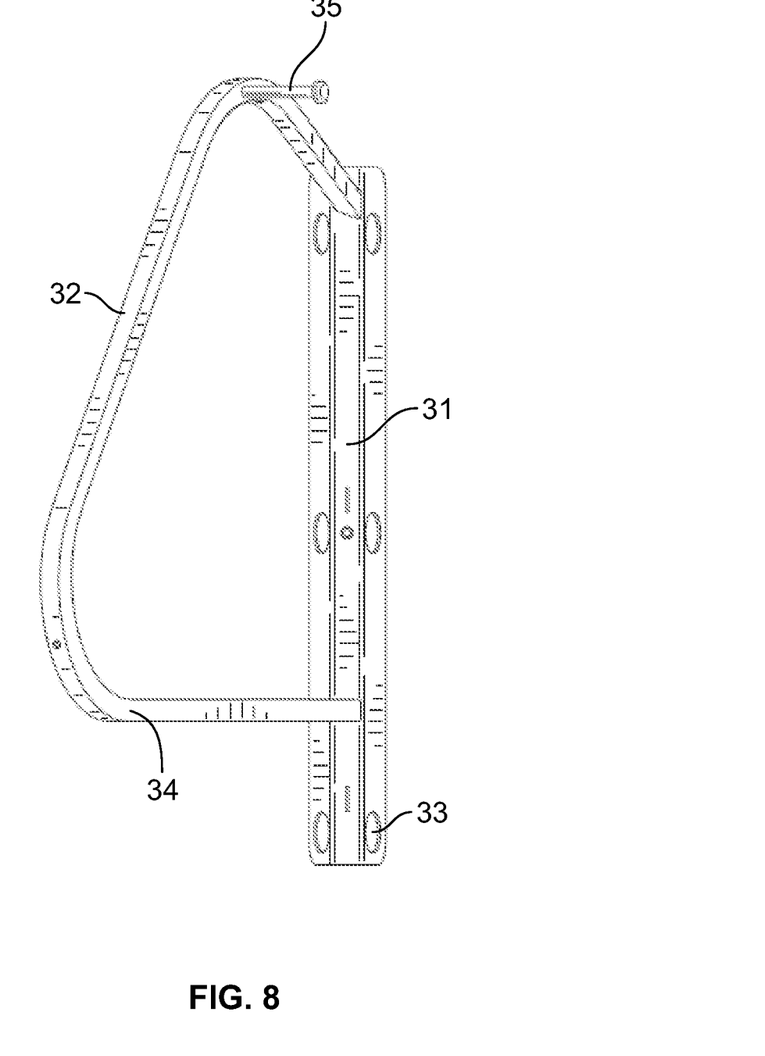
FIG. 8 is a front elevation view of a bicycle hanger having an angled bicycle-hanging component according to an embodiment of the present disclosure.
Figure 9:
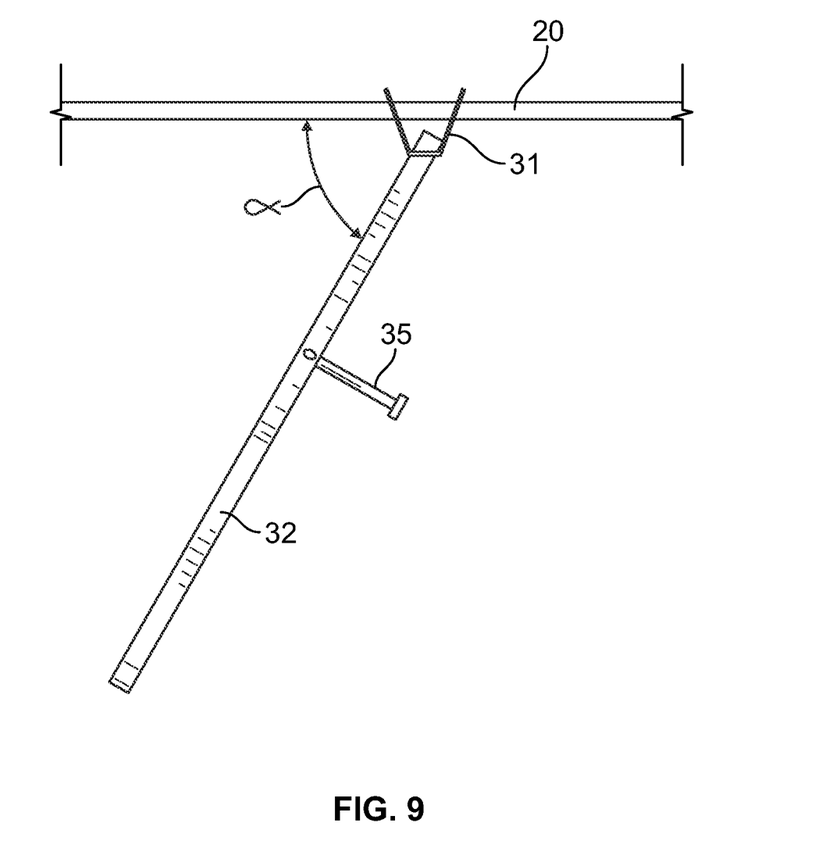
FIG. 9 is a top plan view of a bicycle hanger having an angled bicycle-hanging component according to an embodiment of the present disclosure.
Figure 10:
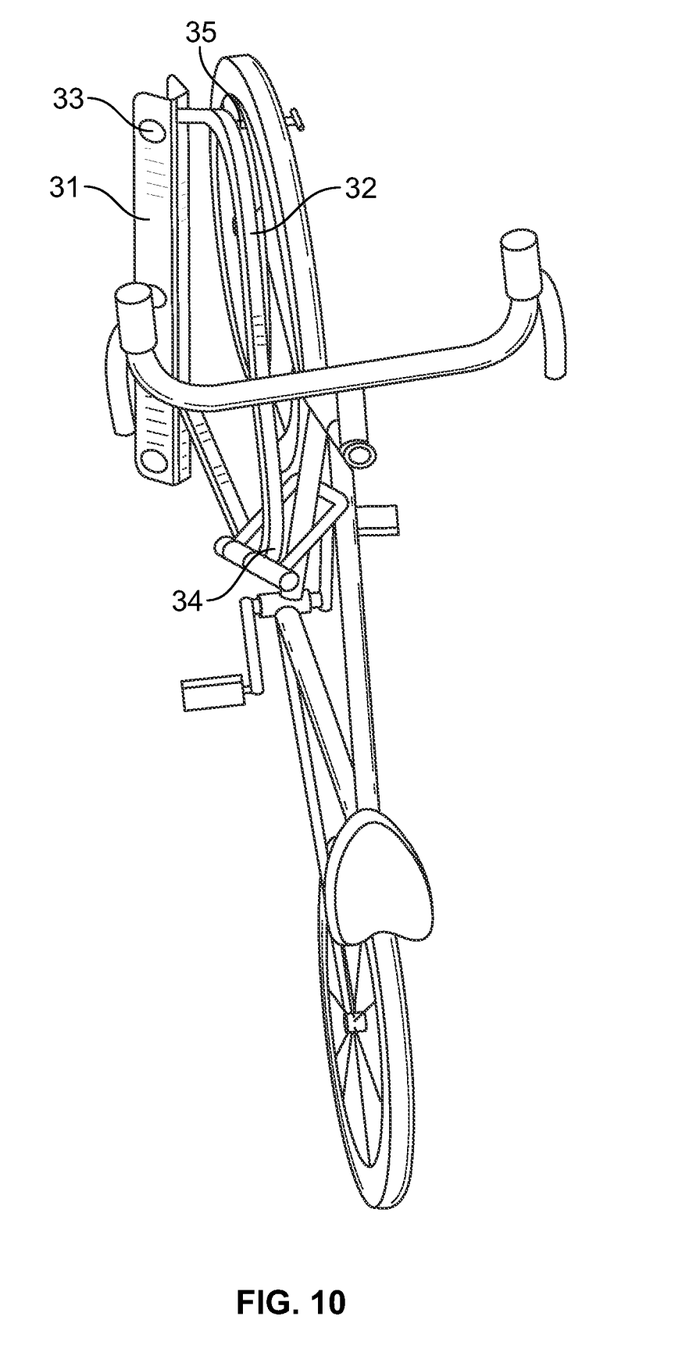
FIG. 10 is a perspective view of a bicycle hanger having an angled bicycle-hanging component according to an embodiment of the present disclosure and showing its use for the secured parking of a bicycle.

In the embodiments shown in FIGS. 1 through 7, each of the plurality of bicycle hangers 30 extend in a direction that is perpendicular to the crossbar assembly 20. These bicycle hangers 30 may be described as being straight. However, in some embodiments, one or more, and desirably each, of the plurality of bicycle hangers 30 may be angled. Embodiments of an angled bicycle hanger 30 are shown in FIGS. 8 to 10. In some embodiments, for example, the bicycle-hanging component 32 of the bicycle hanger 30 may form an angle α with the crossbar assembly 20 that is between about 45° and about 75°, alternatively between about 50° and about 70°, alternatively between about 55° and about 65°, and alternatively about 60°.

Angled bicycle hangers 30 provide the bicycle parking structure 10 with a smaller footprint and, accordingly, an increased parking efficiency. More specifically, angled bicycle hangers 30 may provide the parking structure 10 with a decreased depth. For example, in an embodiment where the depth of a parking structure 10 is about forty inches (as described above) using bicycle hangers 30 that extend perpendicular from the crossbar assembly 20, the depth of the parking structure 10 may be decreased to about thirty-six inches by replacing the straight bicycle hangers with angled bicycle hangers. This additional space-saving feature may provide important benefits in certain locations where high volume parking is needed.

Because it provides for the high-density parking of a large number of bicycles within a small footprint, the bicycle parking structure 10 of the present disclosure may be particularly useful for high volume parking of bicycles at public transit stops, such as train stations, bus stations, and other mass transit hubs. Because the bicycle parking structure 10 of the present disclosure makes such an efficient use of floor space, it may also be particularly useful for bicycle parking at housing units such as apartment complexes, condominiums, student housing units, and the like. The bicycle parking structure 10 of the present disclosure may also be useful for space-efficient bicycle storage, such as may occur in a storage unit, at a police station, etc.

It can be seen that the described embodiments provide a unique and novel bicycle parking structure 10 that has a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A bicycle parking structure comprising
a plurality of bicycle hangers, each bicycle hanger being configured to support a bicycle in a substantially vertical position, such that a front wheel of the bicycle is located substantially vertically above a rear wheel of the bicycle; and
a crossbar assembly, the crossbar assembly supporting the plurality of bicycle hangers in a spaced apart relationship along a length of the crossbar assembly;
wherein each of the bicycle hangers may be secured to the crossbar assembly or unsecured from the crossbar assembly, the unsecured bicycle hanger being movable to a different position along the length of the crossbar assembly without being removed from the crossbar assembly;
wherein each bicycle hanger comprises
a body providing a surface to which a bicycle frame can be locked using a conventional U-lock,
an arm configured to pass through a front wheel of a bicycle so that an underside of the front wheel rim rests on top of the arm, and
a mounting component;
wherein the body comprises an upper region that extends outward from the mounting component, a front region that extends downward and outward from the upper region, and a lower region that extends from the front region back to the mounting component, and
wherein the arm projects from the side of the body at the upper region.

2. The bicycle parking structure of claim 1, wherein each of the bicycle hangers may be secured at substantially any location along the length of the crossbar assembly.

3. The bicycle parking structure of claim 1, wherein the crossbar assembly comprises a first crossbar and a second crossbar, the first and second crossbars being vertically spaced from one another.

4. The bicycle parking structure of claim 3, in which each bicycle hanger is configured to be mounted to the crossbar assembly at one of two or more different heights.

5. The bicycle parking structure of claim 4, wherein the heights of the bicycle hangers are staggered along the length of the crossbar assembly.

6. The bicycle parking structure of claim 5, wherein a distance between adjacent bicycle hangers is between twelve inches and twenty-four inches.

7. The bicycle parking structure of claim 6, wherein the distance between adjacent bicycle hangers is between fourteen inches and twenty-two inches.

8. The bicycle parking structure of claim 1, wherein each of the bicycle hangers is secured to the crossbar assembly by one or more fasteners.

9. The bicycle parking structure of claim 8, wherein the one or more fasteners are selected from bolts, screws, rivets, and clips.

10. The bicycle parking structure of claim 1, further comprising a first leg configured for supporting a first end of the crossbar assembly and a second leg configured for supporting a second end of the crossbar assembly.

11. The bicycle parking structure according to claim 10, further comprising a tire stop spanning between the first and second legs and positioned at a height that is configured to align with a rear tire of a bicycle supported in the substantially vertical position.

12. The bicycle parking structure according to claim 10, wherein the second leg is also configured to support the first end of an additional crossbar assembly.

13. The bicycle parking structure of claim 1, further comprising a first wall bracket configured for mounting a first end of the crossbar assembly to a wall and a second wall bracket configured for mounting a second end of the crossbar assembly to the wall.

14. The bicycle parking structure of claim 13, in which the second wall bracket is also configured to mount the first end of an additional crossbar assembly to the wall.

15. The bicycle parking structure of claim 1, in which at least the body of the bicycle hanger is made of squared steel tubing.

16. The bicycle parking structure of claim 1, wherein at least a portion of the body is angled toward a first end or a second end of the crossbar assembly, such that at least the portion of the body forms an angle other than 90° with respect to a longitudinal axis of the crossbar assembly.

17. A bicycle parking structure comprising
 a plurality of bicycle hangers, each bicycle hanger being configured to support a bicycle in a substantially vertical position, such that a front wheel of the bicycle is located substantially vertically above a rear wheel of the bicycle; and
 a crossbar assembly comprising a first crossbar and a second crossbar, the first and second crossbars being vertically spaced from one another, the crossbar assembly supporting the plurality of bicycle hangers in a spaced apart relationship along a length of the crossbar assembly;
 wherein each of the bicycle hangers may be secured to the crossbar assembly or unsecured from the crossbar assembly, the unsecured bicycle hanger being movable to a different position along the length of the crossbar assembly without being removed from the crossbar assembly;
 wherein each bicycle hanger comprises
  a body providing a surface to which a bicycle frame can be locked using a conventional U-lock,
  an arm configured to pass through a front wheel of a bicycle so that an underside of the front wheel rim rests on top of the arm, and
  a mounting component;
 wherein the body comprises an upper region that extends outward from the mounting component, a front region that extends downward and outward from the upper region, and a lower region that extends from the front region back to the mounting component; and
 wherein each of the bicycle hangers may be secured at substantially any location along the length of the crossbar assembly.

18. The bicycle parking structure of claim 16, wherein at least the portion of the body angled toward the first end or the second end of the crossbar assembly forms an angle between about 45° and about 75° with the longitudinal axis of the crossbar assembly.

19. The bicycle parking structure of claim 17, wherein the heights of the bicycle hangers are staggered along the length of the crossbar assembly.

20. The bicycle parking structure of claim 17, further comprising a first leg configured for supporting a first end of the crossbar assembly and a second leg configured for supporting a second end of the crossbar assembly.

21. The bicycle parking structure according to claim 20, wherein the second leg is also configured to support the first end of an additional crossbar assembly.

22. The bicycle parking structure of claim 17, wherein at least a portion of the body is angled toward a first end or a second end of the crossbar assembly, such that at least the portion of the body forms an angle other than 90° with respect to a longitudinal axis of the crossbar assembly.

23. The bicycle parking structure of claim 22, wherein at least the portion of the body angled toward the first end or the second end of the crossbar assembly forms an angle between about 45° and about 75° with the longitudinal axis of the crossbar assembly.

* * * * *